United States Patent
Mathison et al.

(10) Patent No.: US 7,325,561 B2
(45) Date of Patent: Feb. 5, 2008

(54) HYDROGEN VEHICLE GAS UTILIZATION AND REFUELING SYSTEM

(75) Inventors: Steven R. Mathison, Torrance, CA (US); Shiro Matsuo, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 161 days.

(21) Appl. No.: 11/001,881

(22) Filed: Dec. 2, 2004

(65) Prior Publication Data
US 2006/0118175 A1    Jun. 8, 2006

(51) Int. Cl.
*F17D 1/00*    (2006.01)
(52) U.S. Cl. .................. 137/256; 137/899; 141/197
(58) Field of Classification Search ............... 137/256, 137/255, 266, 899; 141/18, 95, 197, 231
See application file for complete search history.

(56) References Cited

U.S. PATENT DOCUMENTS 5,673,735 A * 10/1997 Crvelin et al. ............ 141/197
6,786,245 B1 * 9/2004 Eichelberger et al. ...... 141/197

FOREIGN PATENT DOCUMENTS

| JP | 2001295996 | 10/2001 |
| JP | 2004084808 | 3/2004 |
| WO | WO 2004005792 A | 1/2004 |
| WO | WO 2005010427 | 2/2005 |
| WO | WO 2006021699 | 3/2006 |

* cited by examiner

*Primary Examiner*—Kevin Lee
(74) *Attorney, Agent, or Firm*—Mark E. Duell; Porter Wright Morris & Arthur, LLP

(57) ABSTRACT

A system for increasing the overall efficiency of a hydrogen fueled vehicle and refilling station infrastructure wherein the process of (1) consuming pressurized hydrogen gas that is stored in on board tanks used to power hydrogen fueled motor vehicles and (2) refueling the vehicle tanks at a hydrogen refilling station after the available on board fuel supply in the tanks is consumed is controlled according to a predetermined sequence involving the utilization of the hydrogen in the on board tanks.

17 Claims, 9 Drawing Sheets

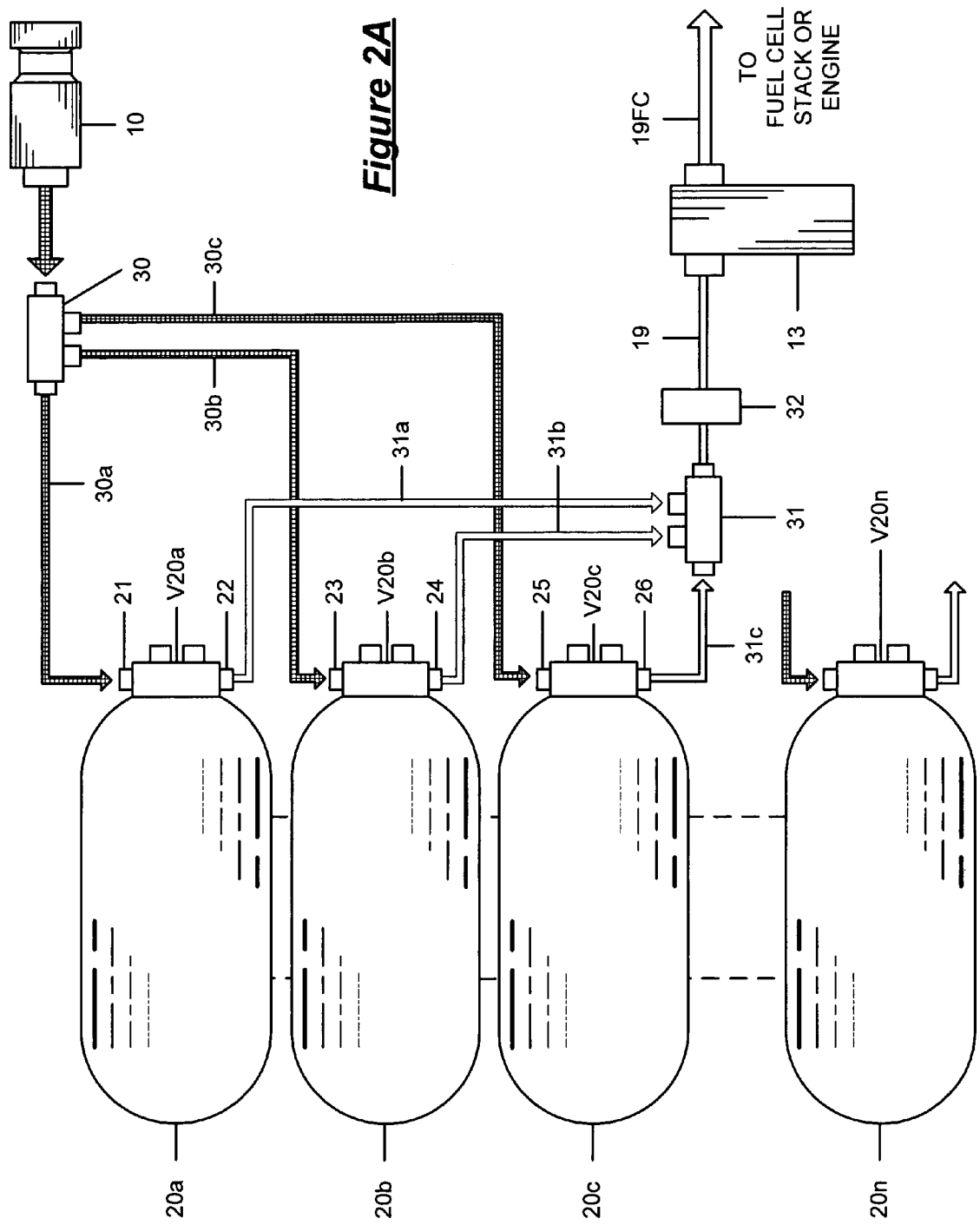

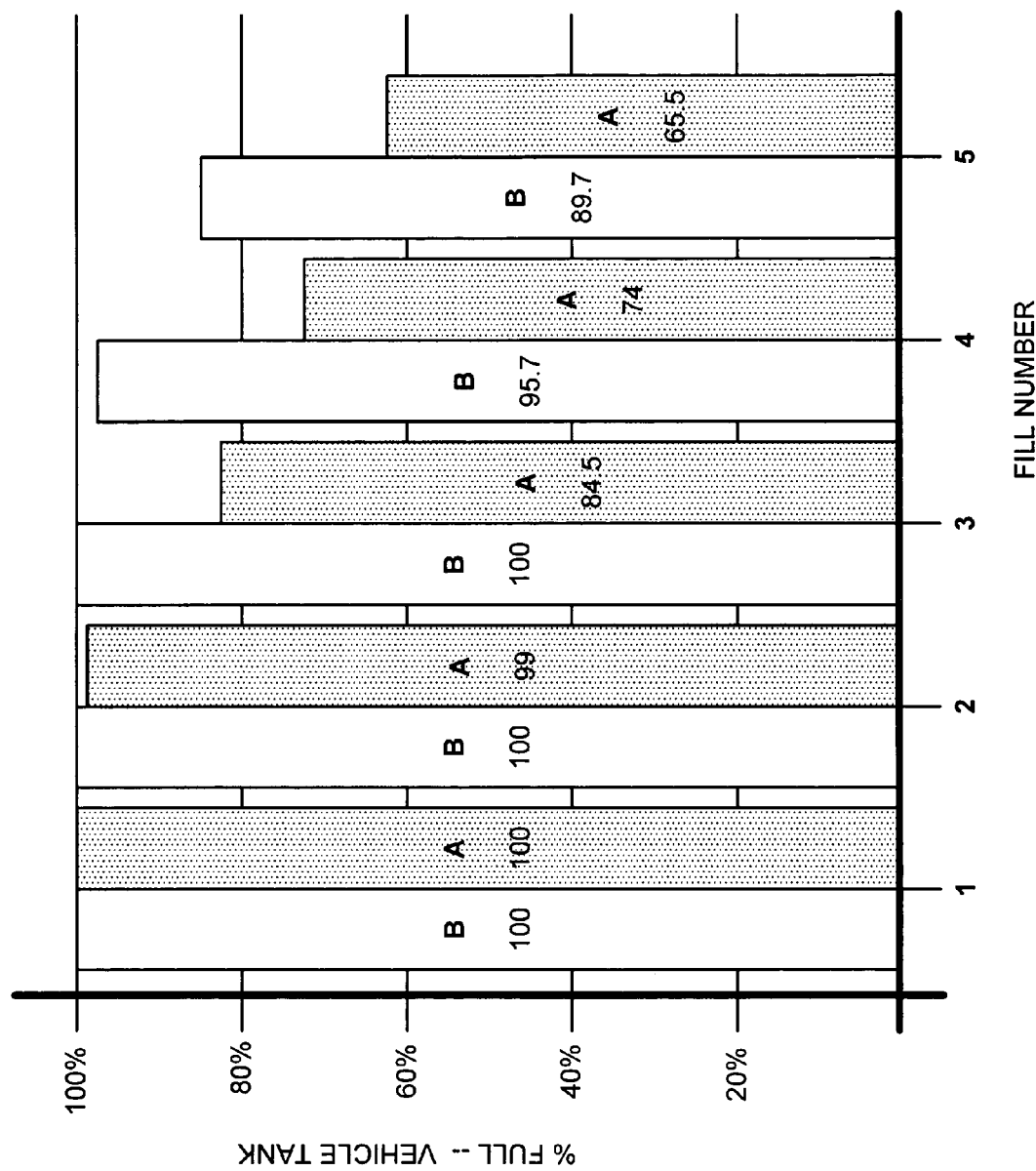

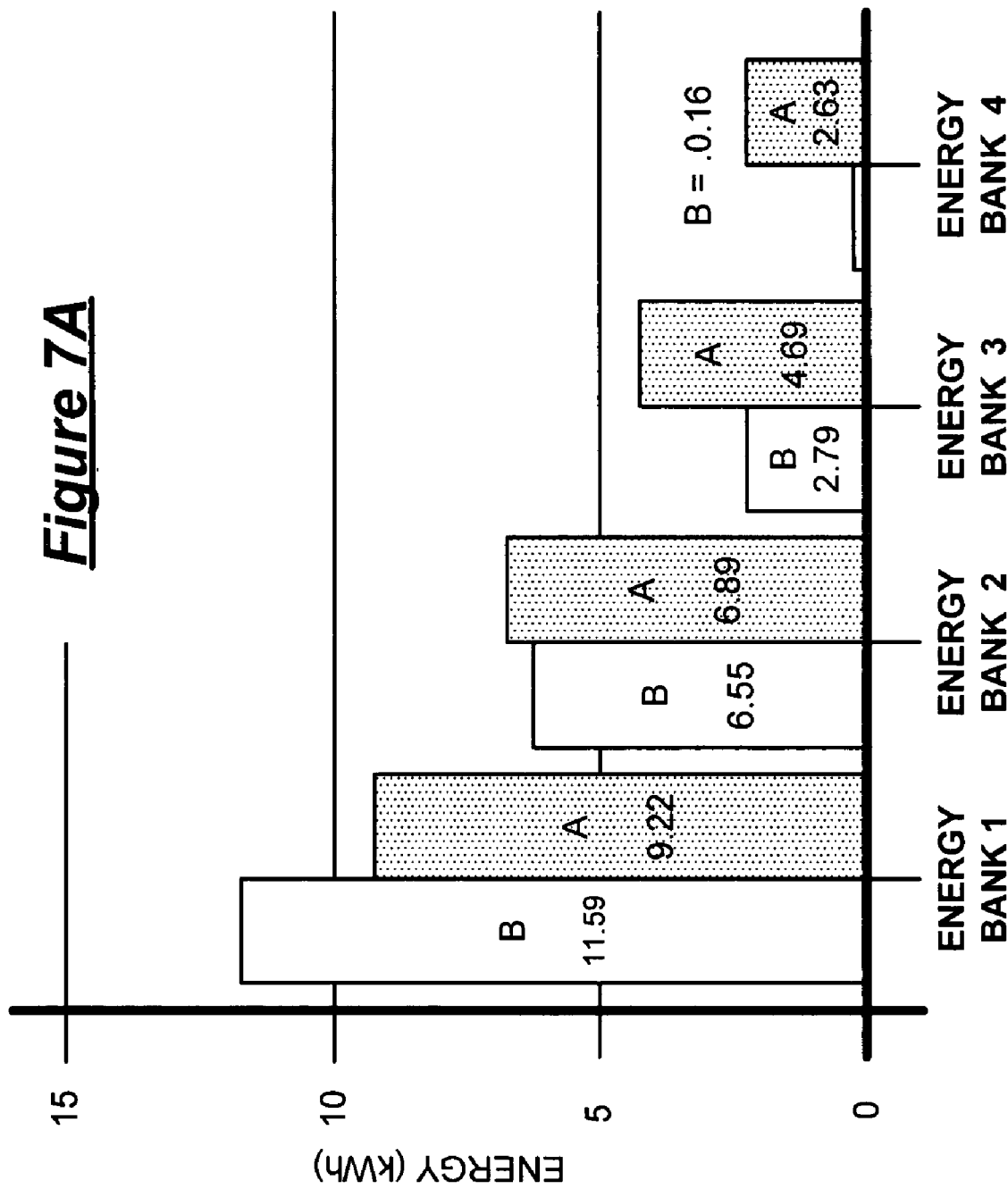

HYDROGEN VEHICLE GAS UTILIZATION AND REFUELING SYSTEM

FIELD OF THE INVENTION

The present invention relates to a system for efficiently evacuating and refueling hydrogen gas from and into multiple high pressure storage tanks such as used on board in motor vehicles and in larger quantities at hydrogen storage and refueling stations.

BACKGROUND OF THE INVENTION

When hydrogen is used as a fuel in motor vehicles, a hydrogen fuel depot infrastructure for refueling must also be developed. Typically, in the use of hydrogen to power fuel cells or internal combustion engines in motor vehicles, hydrogen is stored in on board fuel tanks maintained at a maximum pressure in the range of about 5000 psi. In the instance of a fuel cell powered vehicle, utilization of the hydrogen input into the fuel cell stack occurs at about 30 psi. The consumption and evacuation of hydrogen from on board fuel tanks to power a vehicle having a fuel cell or internal combustion engine should smoothly correlate with a motor vehicle operator's desire for on demand control of the speed, acceleration and other power needs of the operator and vehicle. An increase in the energy efficiency of the overall system of fuel depots and vehicle tanks and their interrelationship is a desirable goal.

Hydrogen powered vehicles may use high pressure hydrogen storage tanks to store hydrogen on board. The use of multiple cylindrically shaped small tanks rather than one large tank is preferred for vehicle design purposes. Current practice is simultaneously to evacuate, as needed, the hydrogen equally from each of the multiple tanks having a parallel outlet relationship. Typically, solenoid outlet valves for all tanks are open simultaneously and the pressure decreases equally in all tanks as the hydrogen is consumed when the vehicle is driven.

Designs for hydrogen refueling stations provide apparatus and systems to replenish hydrogen gas in a motor vehicle tank using a cascade filling process in which there are multiple banks of pressurized hydrogen quantities stored in individual tanks at the station. A first bank (with the lowest pressure) is used to equalize pressure with one or more of the separate tanks in a motor vehicle, then the next bank is utilized to equalize with increased pressure in the vehicle tank, and then the next bank, etc., in a sequence until all banks have equalized in pressure or the fill pressure of the vehicle tank(s) has been reached. In this design, if the first bank at a filling station is at a lower pressure than the vehicle tank(s), then the first bank cannot be used in the filling process; consequently, the next bank at the station with a pressure higher than that of the vehicle tank(s)' pressure must be used. As a result, hydrogen stored in the bank(s) on the refilling station side with pressure lower than the vehicle tank(s) cannot be used to replenish the vehicle fuel supply, and the remaining tanks with higher pressure at the refilling station must be used. This necessary sequence depletes the hydrogen in the higher pressure banks, and does not allow the hydrogen in the lower pressure banks to be fully used.

When a hydrogen powered vehicle is filled with hydrogen, the pressurized storage tanks contain two forms of energy: chemical energy from the hydrogen itself, and mechanical and thermal energy associated with the high pressure under which the hydrogen gas is stored. The mechanical energy from the high pressure under which the hydrogen gas is stored is not utilized when a motor vehicle is driven; thus, the mechanical potential energy from storing hydrogen at high pressure is wasted.

BRIEF SUMMARY OF THE INVENTION

It is an object of the present invention to minimize mechanical energy loss in hydrogen refilling systems when factored into the overall energy efficiency of an infrastructure of hydrogen powered vehicles and fuel depots. Each time a vehicle is refueled with hydrogen, energy is required to compress the hydrogen into the vehicle's tanks, hence, it is an object of the invention to minimize the compression energy required to refill an on board fuel storage tank in a hydrogen powered motor vehicle. It is a further object of the invention to provide a system whereby, one tank at a time, hydrogen is withdrawn from and refilled into multiple tanks, thereby reducing the compression energy required to refill the tanks.

On the refueling station side where the hydrogen station has a limited supply of hydrogen available to fill multiple vehicles, and where a hydrogen station uses the multiple bank cascade fill strategy described above, when the vehicle's tank pressure is greater than any of the station bank pressures, the banks at the station cannot be used to fill the vehicle, and the hydrogen in those banks cannot be utilized. Thus, only banks with pressure higher than that of the vehicle tank(s) are used, depleting the pressure in the banks of higher pressure tanks, resulting in a situation where a succeeding vehicle may not be able to receive a full fill. Using the system described herein, it is an object to enhance the ability of a refilling station to service the fuel needs of hydrogen powered vehicles. The invention also provides a system for evacuating hydrogen from multiple high pressure storage tanks on a vehicle for the purpose of maximizing well to tank energy efficiency.

Currently, all valves on a vehicle with multiple hydrogen storage tanks are opened simultaneously by a control system allowing each tank to contribute equally to supply hydrogen to the fuel cell stack or internal combustion engine. The current technology, however, does not maximize the well to tank energy efficiency of the vehicle or the utilization of the limited supply of hydrogen at a hydrogen filling station. The invention decreases the energy lost to compression of the hydrogen, which results in a higher well to tank efficiency, thus providing a benefit to the environment, to the station provider, and to the vehicle owner. In addition, the invention increases the amount of utilizable hydrogen at a hydrogen station with limited storage capacity. In the invention, the pressure in the vehicle tank(s) is minimized, allowing the hydrogen in the lower pressure banks at the hydrogen station to be used, resulting in better utilization of the limited hydrogen stored at the station.

The invention is described more fully in the following description of the preferred embodiment considered in view of the drawings in which:

BRIEF DESCRIPTION OF THE SEVERAL VIEWS OF THE DRAWINGS

FIG. 2A shows a hydrogen fuel tank system configured in accordance with the system of the invention.

FIG. 6 is a chart comparing the on board vehicle hydrogen storage tank pressures measured by percent full of all tanks (i.e., vehicle total fuel capacity) after successive refills using the system of the invention "B" with successive refills using the prior art "A".

FIG. 7A is a comparison of the calculated "ideal" compression energy required to fill each station bank directly to full after two vehicle fills.

DETAILED DESCRIPTION OF THE INVENTION

The system of the invention increases the refueling energy efficiency of hydrogen powered vehicles by withdrawing hydrogen from one tank, in the bank of multiple on board storage tanks, at a time, until a cut off or threshold minimum pressure is reached. When the threshold cut off pressure is reached in a tank in use, the next tank in sequence is opened to allow gas flow from the next tank to the fuel cell or engine. This process is repeated for all tanks on the vehicle. In the overall vehicle/refueling station system, when the vehicle is refueled with hydrogen, less compression energy is required to refill the tanks. The invention increases the total energy efficiency from well to tank and increases hydrogen station gas utilization by utilizing more efficiently the limited quantity of hydrogen at the filling station and by reducing the energy required to compress the hydrogen at the station (or to the vehicle directly) back to a full state after refueling. The invention conserves the high pressure hydrogen at the station, and, in effect, maximizes the hydrogen utilization on the station side. More vehicles can be filled at a station using the invention because more of the low pressure hydrogen at the station is used in filling the vehicle tanks, preserving the higher pressure hydrogen, and increasing the capability for overall utilization of the limited supply of hydrogen at the station.

Figure 1:
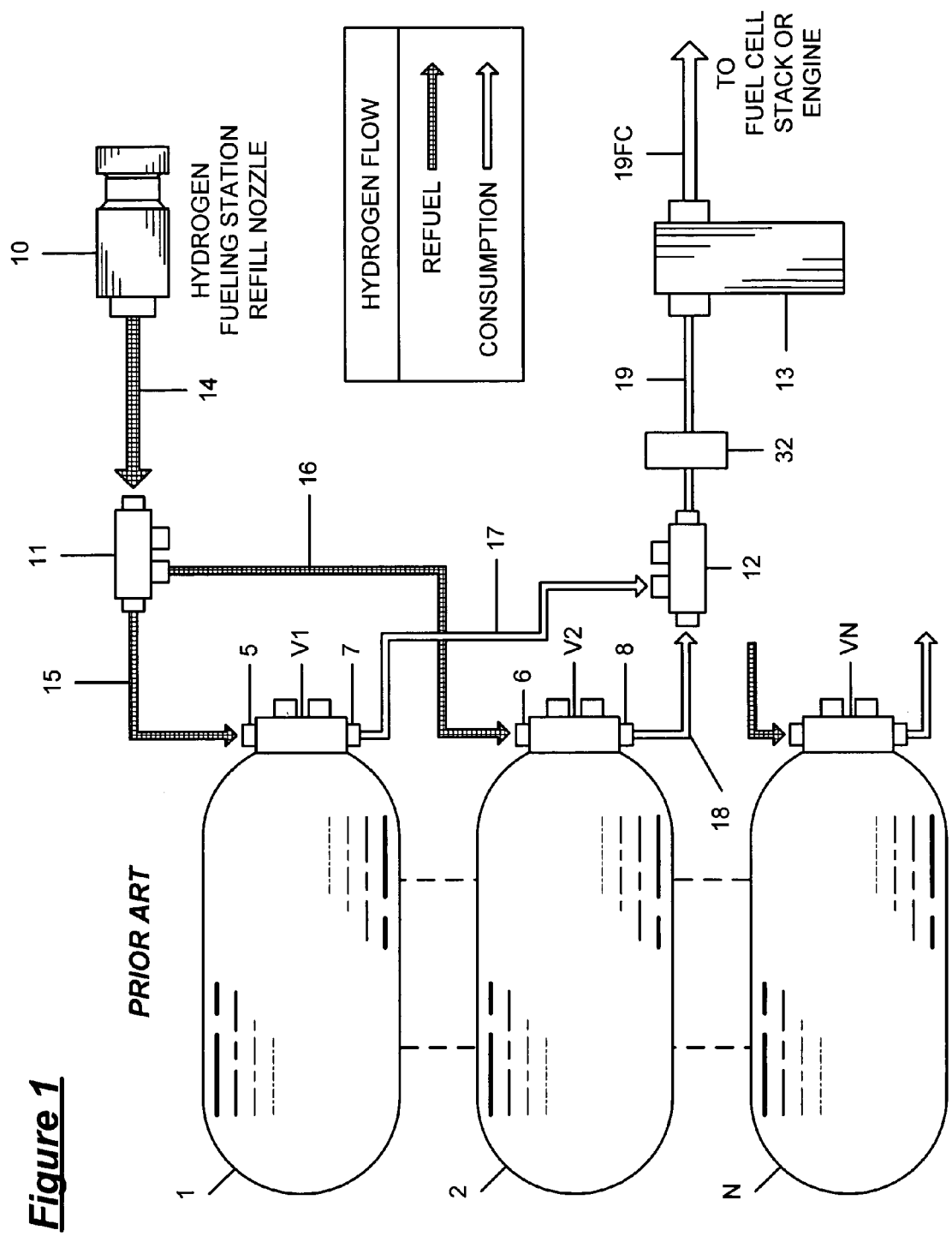
FIG. 1 shows a prior art hydrogen fuel tank system.

FIG. 1 illustrates an example of a prior art hydrogen storage tank system for motor vehicles. A first tank 1 includes valve V1 with check valve inlet 5 and switchable outlet 7. A second tank 2 includes valve V2 with check valve inlet 6 and switchable outlet 8. Second, third and other tanks N and valves VN are similarly configured in parallel. Tank 1 and tank 2 are interconnected in parallel through conduits emanating from refueling joint or manifold 11 and gas utilization joint or manifold 12. Refueling joint or manifold 11 is interconnectable with refueling nozzle 10 through conduit 14. Gas utilization joint or manifold 12 is interconnected to on board tanks 1 and 2 through conduits 17 and 18 which lead through conduit 19 through high pressure regulator 32 and low pressure regulator 13 to the vehicle fuel cell stack or engine 19FC. Typically the vehicle tanks are cylindrical with hemispherical ends and are capable of storing a charge of hydrogen gas at an approximately 5000 psi maximum rated capacity at a defined temperature. In the refuel mode through conduits 15 and 16 and in the consumption mode through conduits 17 and 18, an equal pressure or quantity of hydrogen gas is respectively input into and evacuated from each parallel tank. When the vehicle is started, before the fuel cell or engine can begin generating power, the outlet 7 on tank 1 and outlet 8 on tank 2 in the valves V1 and V2 open to allow hydrogen to flow. Normally, all the outlet valves on the on board tanks leading to the fuel cell stack or vehicle engine are opened simultaneously, allowing each tank to contribute hydrogen to the vehicle equally. As the hydrogen is consumed, pressure drops equally in all tanks on board the vehicle.

In contrast, the system of the invention, in one example, opens the outlet valve on one fuel tank at a time, allowing the hydrogen from a single tank to flow to the fuel cell stack until the tank's pressure reaches a minimum threshold or cut off pressure, at which time, the outlet valve on a next tank in sequence is opened, and the outlet valve from the tank then in use is closed, whereupon hydrogen from the full (next) tank flows to the fuel cell stack. The sequence is repeated until all of the hydrogen in all of the tanks is evacuated to the cut off or operability threshold level, or until the vehicle tanks are refueled.

FIG. 2A illustrates a motor vehicle hydrogen storage tank system of the invention in which tanks 20a, 20b, 20c . . . 20n are capable of sequential interconnection and control allowing hydrogen evacuation and fill to proceed in a controlled sequence dependent upon individual tank pressure. The tanks 20a, 20b, 20c . . . 20n respectively include valves V20a, V20b, V20c . . . V20n each respectively including controllable inlet, 21, 23, 25, . . . for refilling, and controllable outlet 22, 24, 26, . . . for use when gas is required for the fuel cell or engine. In the refueling mode, joint or manifold 30 interconnects with refueling nozzle 10, interconnectable with the fuel supply at the refilling station, and allows gas flow in conduits 30a, 30b and 30c through valves 21, 23 and 25 to sequentially refill tanks 20a, 20b, 20c . . . 20n. In the operating mode, when valves 21, 23 and 25 are closed, tanks 20a, 20b, 20c . . . 20n are sequentially evacuated when valves 22, 24, 26, . . . are respectively switched open to allow gas flow sequentially in conduits 31a, 31b and 31c to, in an example with a fuel cell stack, through conduit 19 to first pressure regulator 32 (reducing pressure from about the 5000 psi maximum, and lower as the gas is consumed, to about a consistent 100 psi level) and second pressure regulator 13 (reducing and maintaining pressure from about 100 psi to about 30 psi) and ultimately to fuel cell stack 19FC at a suitable predetermined operating pressure. In a design example for a fuel cell stack on a vehicle, the minimum remaining tank (or cut off or operating threshold minimum) pressure is about 150 psi, at which pressure, the controllable outlet valve associated with the tank closes. Preferably, before the outlet valve in the tank closes, the outlet valve in the next succeeding tank is opened so that the supply of hydrogen to the fuel cell is uninterrupted. As referred to in the application, except for automatic check valves, valves controllable otherwise in the system may be operated by a solenoid or other actuator means.

Figure 2B:
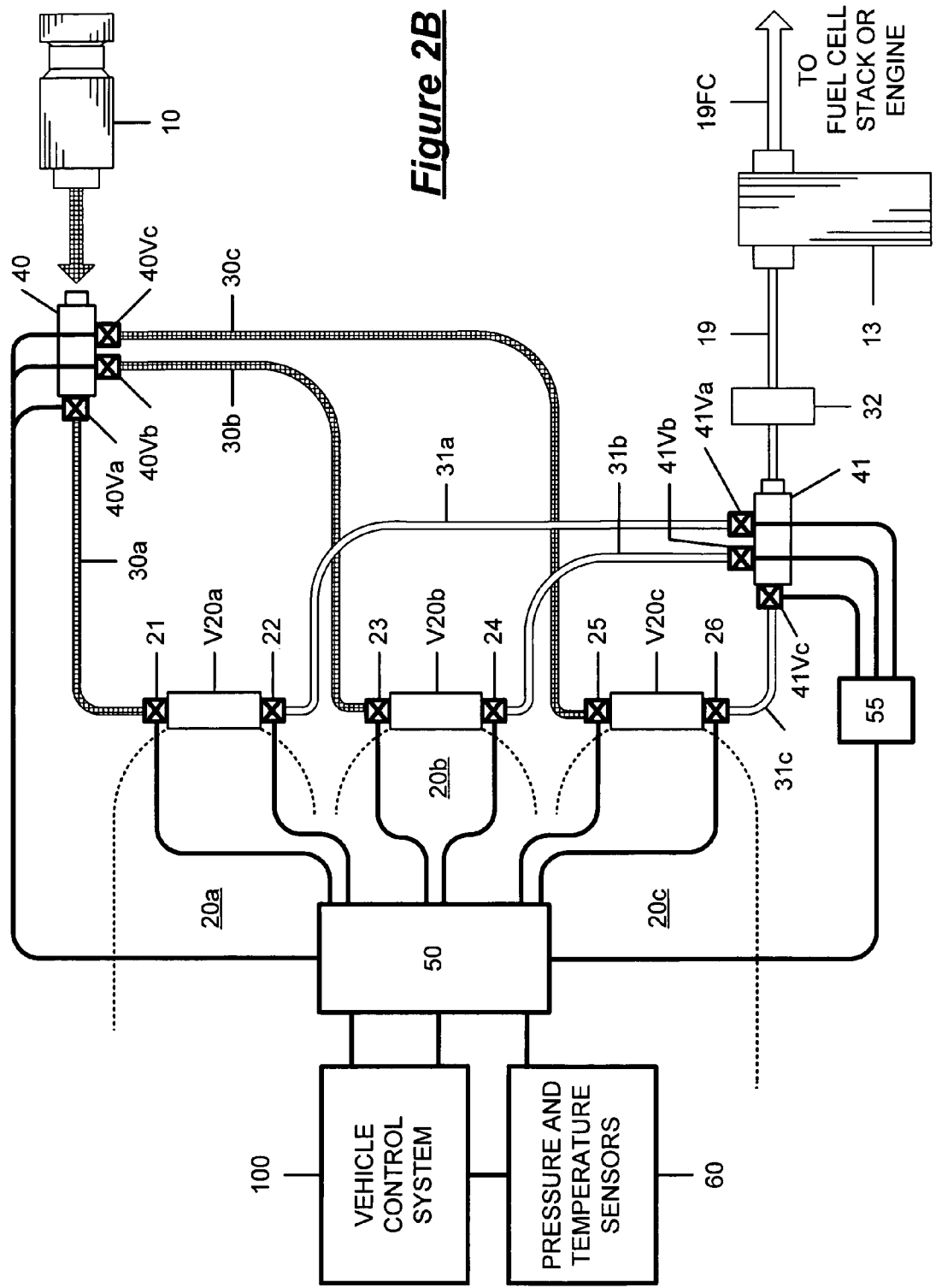
FIG. 2B shows the hydrogen tank valves operatively interconnected with a control means for regulating hydrogen flow to and from valved tanks and, in an alternative or supplemental configuration, a inlet manifold and an outlet manifold having controllable valves interconnected with the tank inlets and outlets and leading to and from the vehicle fuel cell.

As shown in the example of FIG. 2B, selectable or controllable inlet valves 21, 23 and 25 and selectable or controllable outlet valves 22, 24 and 26 on each tank 20a, 20b and 20c may be operatively interconnected with a control means, logic circuit, or CPU 50 and the vehicle control system 100 and a pressure and/or temperature or other sensing means associated with the tanks or their inlet and outlet lines. As an alternative or supplemental control system, manifolds 40 and 41, respectively located between the tanks and the refill line and the hydrogen fuel cell stack or engine may have a plurality of controllable valves. In the inlet manifold 40 leading from the refill line, the controllable valves include valves 40Va, 40Vb and 40Vc associated with each tank inlet. The outlet manifold includes controllable valves 41Va, 41Vb and 41VC, each connected to the outlet of an associated tank. The manifold valves may be controlled by means 50 to allow hydrogen flow to or from a selected tank from the refill line or to the fuel cell or engine until a cut off or threshold pressure or temperature or other parameter, as appropriate in a particular instance, in the selected tank or line is reached. As shown, outlet manifold 41 may include a plurality of selectable or controllable valves 41Va, 41Vb and 41Vc interconnected with the outlets 22, 24 and 26 of the vehicle tanks 20a, 20b and 20c, controlled by a separate manifold valve switching means 55, interconnected with means 50. Specific control configurations and parameters, and valve locations and systems in accordance with the principles of the invention are preferably based on overall vehicle design considerations. For example, tank valves may not be required to the extent that a manifold valve system is sufficient or both tank and manifold valves may be included. In another example, pressure, temperature and other sensors 51 may be provided to monitor tank and/or line pressures and temperatures or other parameters, and the measure of the pressure and temperature or other parameter sensed may be input into an appropriate control means as a determinant associated with the operating protocol of the tank or manifold valve system for refilling and consumption of pressurized hydrogen fuel in the course of vehicle operation in accordance with the principles of the invention.

Where a hydrogen powered vehicle has multiple pressurized on board storage tanks for hydrogen gas, the system reduces the compression energy required to refill the vehicle tanks. Each tank on the vehicle has an inlet valve connectable to the refilling line through a manifold, and an inlet valve allows pressurized hydrogen from the refilling line to flow into one or more on board tank until the pressure in the one or more on board tank reaches a predetermined level; and when the pressure in the one or more tank reaches a predetermined level, hydrogen from the refilling line flows to the one or more next on board tank until the pressure in the next one or more tank reaches a predetermined level. This sequence is repeated for all tanks on the vehicle until all tanks are filled.

In examples, the predetermined level of the pressure in the tank may essentially correspond to the available maximum pressure in the refill line. The inlet valve of each on board tank may be a pressure sensitive check valve that prevents backflow when the pressure in the tank equals the pressure in the refill line, wherein the tanks are filled in order from the lowest pressure to the highest pressure until the pressure in the tanks equals the pressure in the refill line. Likewise, a controllable solenoid valve operated by a suitable control means may control the refilling.

In an example of a refilling process where the tank inlets are configured with controlled valves, the closing of the inlet valve on a first tank may selectively occur before, simultaneously with, or after the opening of an inlet valve on a next tank. Pressure sensors in each tank or valve or line may be operably interconnected with a control mechanism that opens and closes the valves and the control mechanism may comprise an on board programmable logic circuit, an on board CPU, or comparable means. Where a vehicle has three or more tanks, the inlets of two or more tanks may be paired together in parallel and controlled as one.

In refilling vehicle tanks, the invention provides a system for reducing the compression energy required to refill more than one on board tank. In an example where tank inlets are configured with check valves which close automatically to prevent backflow and the refilling line simultaneously connects to the inlet to each tank, a tank check valve allows hydrogen to flow into a first on board tank with the lowest pressure. Since the multiple on-board tanks will be at different pressure levels when the refilling process begins, hydrogen gas will naturally flow to the tank with the lowest pressure first, until it reaches the pressure of the next highest tank, where upon the hydrogen gas will commence flowing into both the first tank and the second tank simultaneously. This process will continue to progress until the tank pressures reach the maximum pressure available from the refilling line. If the available refilling line pressure is greater than the pressure in all of the on-board tanks, then before the refilling process ends, hydrogen will be flowing simultaneously into all of the on-board tanks until the rated tank capacity is reached or the available refilling line pressure is reached. Thus, when the vehicle is refueled, the hydrogen naturally flows to the lowest pressure tank first, utilizing the low pressure storage at the station. Nothing special needs to be done for this fill sequence to occur; the multiple tanks on the vehicle naturally fill in the order of first, the lowest pressure tank, repeating the process, and concluding with all tanks with pressures less than the available refilling line pressure filling simultaneously.

Figure 3B:
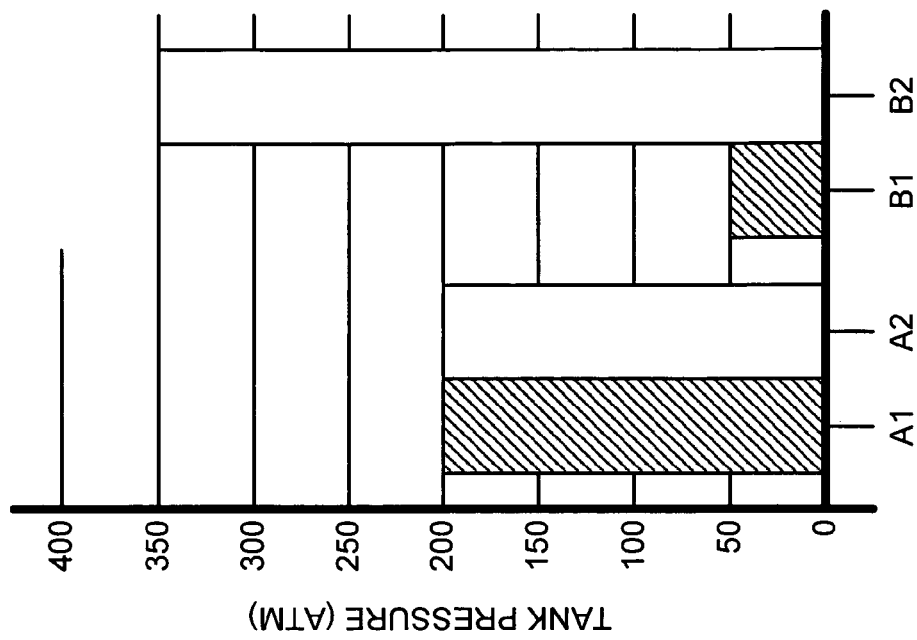
FIG. 3A and FIG. 3B, respectively, show before and after comparisons of the utilization of on board hydrogen gas fuel, measured by individual tank pressure, respectively, in vehicle "A" using a prior art system and vehicle "B" using the system of the invention. Full fill and 50% utilization are shown as examples.
Figure 3A:
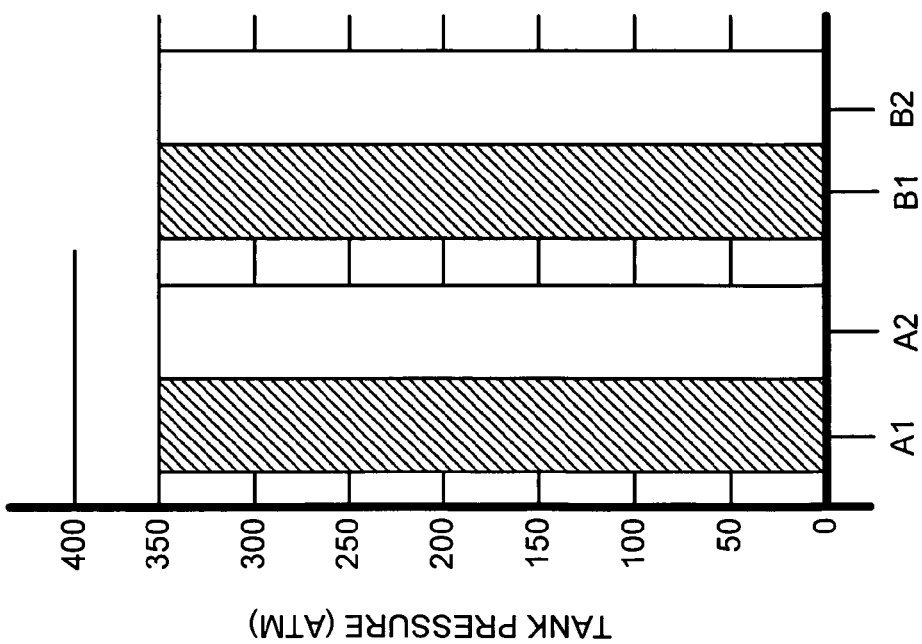

FIG. 3A and FIG. 3B, respectively, show before and after comparisons of the utilization of pressurized on board hydrogen gas fuel in two vehicles, each having two tanks, measured by tank pressure, respectively, in vehicle "A" using a prior art system and vehicle "B" using the system of the invention. Both vehicles start with a full fill; a comparison is made after driving 50% of the vehicle fuel capacity. FIG. 3A and FIG. 3B illustrate the advantage achieved by use of the invention "B" in comparison with the prior art "A" using a vehicle with two fuel tanks as an example. As shown in FIG. 3A, both vehicles begin with a 100% fill. In the prior art example, when fuel is consumed, the outlet valves on both tanks are open at the same time; in the example illustrating the invention, when fuel is consumed, the outlet valve on only one tank is open and the tank is evacuated until the pressure threshold minimum is reached. FIG. 3B shows pressure in the tanks of both vehicles after driving half of the vehicle range determined by fuel capacity in a situation where overall fuel consumption in each vehicle is the same 50%, colloquially, leaving the overall vehicle fuel supply either half full or half empty. The tanks A1 and A2 in vehicle A are at 50% each, whereas the tanks B1 and B2 in vehicle B are respectively exhausted, namely, the low pressure operability threshold is reached, (B1), and at full capacity, 100% (B2). When both valves on both tanks are open at the same time, pressure and gas utilization in each tank is the same. Applying the invention, the scenario shown in FIG. 3B illustrates that when valves on the separate tanks are open in a one tank at a time sequence, tank pressure and gas utilization occurs in a first tank until pressure in the tank reaches the operability threshold and the other tank remains fully charged.

Figure 4:
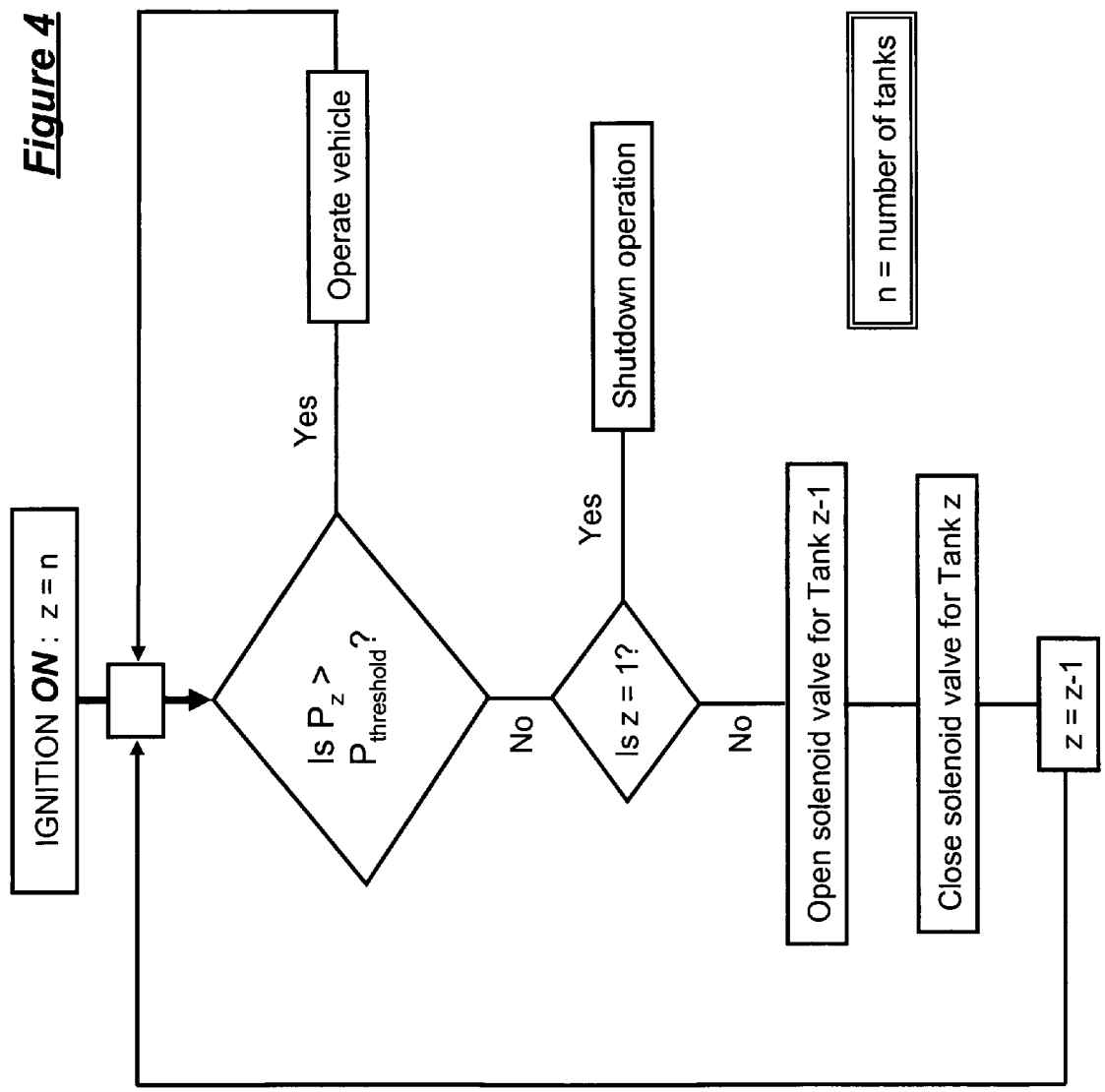
FIG. 4 is flow diagram of an example of the logic control of the system of the invention.

FIG. 4 shows an example of the operating logic of the system of the invention where "n" represents the number of on board tanks (two (2) or greater) and "z" represents the number of a tank in sequence overall in the on board system. Hydrogen is evacuated from tank "z" until the threshold operating minimum (or other selected, predetermined, measured, check valve, controlled, or cut off) pressure is reached. Upon this threshold, the valve for tank "z-1" is opened and the solenoid valve for tank "z" is shut down, i.e., the outlet valve is closed. Successive tanks in the on board hydrogen bank are evacuated using the same protocol. Alternative configurations, timing sequences, pressure thresholds, and valve control means utilized in the evacuation of the tanks may be adapted from comparable alternatives described above with respect to the filling system and illustrated in part in FIG. 2B. In FIG. 2B, a controller based upon a logic circuit or CPU is shown at 40 and a valve controlled manifold is shown at 41. Manifold 41 may have intrinsic pressure control means or may be controlled by unit 40. In FIG. 2B, the controllable manifold 41 for selecting tank flow based on pressure parameters is shown wherein valves or switches 41Va and 41Vb associated with tanks 20a and 20b are closed and the valve or switch 41Vc associated with tank 20c is open.

Figure 5:
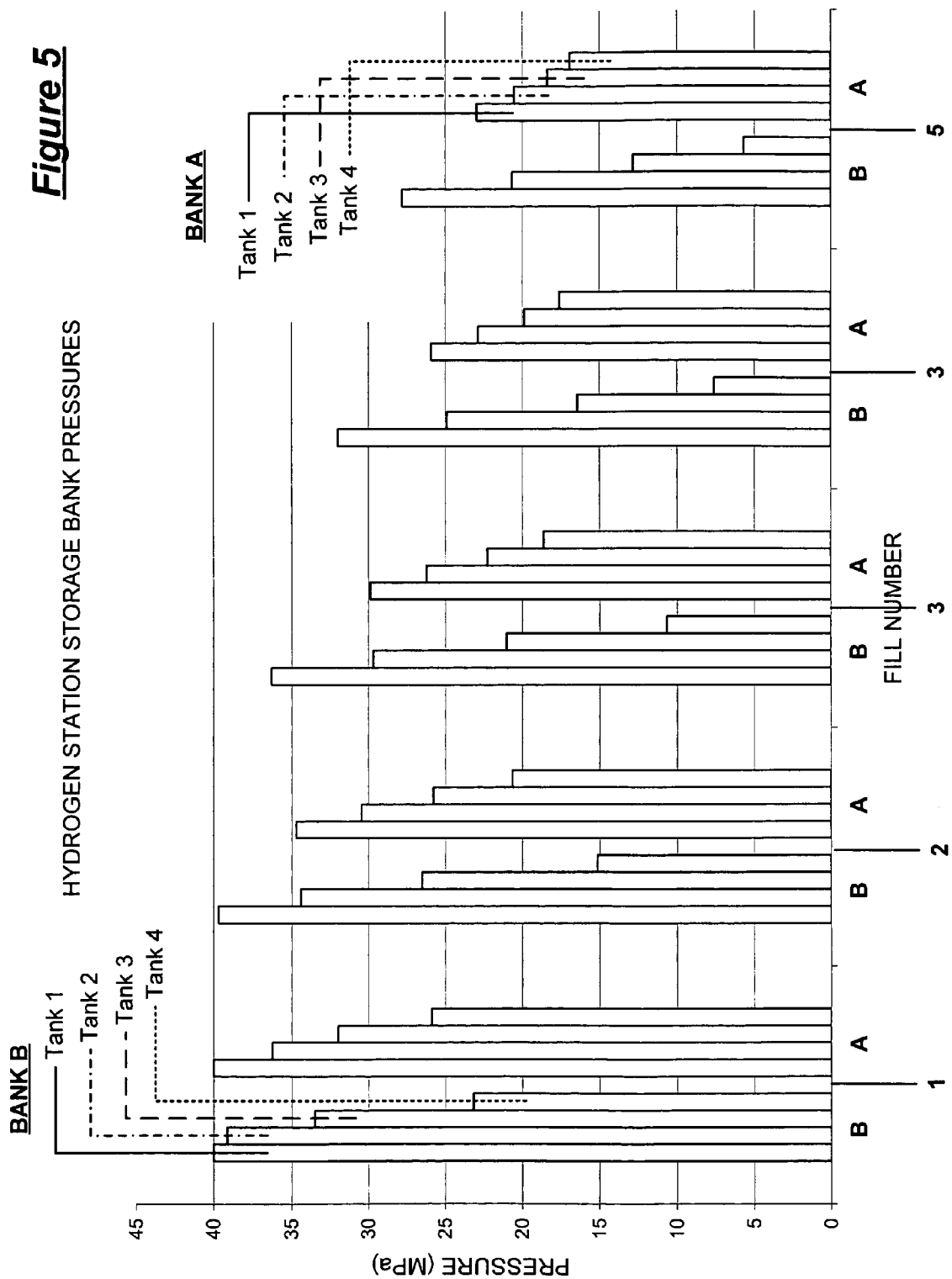
FIG. 5 illustrates comparisons of the utilization of hydrogen gas fuel, measured by the pressure in separate hydrogen refueling station tanks in the instance when vehicle "A" using a prior art system and vehicle "B" using the system of the invention are refueled in a sequence of successive fillings.

The invention achieves further benefits in utilizing the limited quantity of hydrogen at a filling station. In the comparison chart shown in FIG. 5, two scenarios involving five vehicles were evaluated: (1) five vehicles utilizing the invention are refueled consecutively (or the same vehicle is refilled five times, or any other combination of vehicles and fills equaling five) at a hydrogen station; and (2) five vehicles utilizing a conventional method are refueled consecutively at a hydrogen station. The number of banks at the station is four (Bank 1, Bank 2, Bank 3, Bank 4) with a volume of each bank of 200 liters. On the vehicle side, the number of tanks per vehicle is two and the volume of each tank is 100 liters. After successive refills, the pressure in Bank 4 at the station refilling vehicles using the system of the invention is consistently higher. Vehicle fill percentage (% of total fuel capacity) is shown in FIG. 6; the station can fill three vehicles (or provide three refills) using the invention "B" to 100% full, but can fill only one conventional vehicle "A" to 100% full. In fill numbers four and five, the invention achieves a substantial advantage in fill quantity, 95.7% vs. 74% for the conventional system in fill four and 89.7% vs. 65.5% for the conventional system in fill five. Bank 4 pressure is consistently higher utilizing the invention.

A further benefit in utilizing the invention is achieved in terms of the energy required to compress the hydrogen at the station (or to the vehicle directly) back to a full state after refueling. Using as an example, a vehicle with two tanks and two fills, the energy required to compress the hydrogen back to a full state for the station and the vehicle was calculated and compared for prior art scenario A and invention scenario B. The energy required for compression after two fills was calculated for each scenario in accordance with the formula for "ideal" compression energy:

$$E = \frac{V}{cP_s^c}(P_f^{c+1} - P_i^{c+1}) - \frac{V}{c}(P_f - P_i)$$

where $E$ = Ideal Compression Energy $V$ = Volume of Storage Tank $P_f$ = Compressor Outlet pressure $P_i$ = Compressor Inlet pressure $$c = \frac{k-1}{zk}$$

Figure 7B:
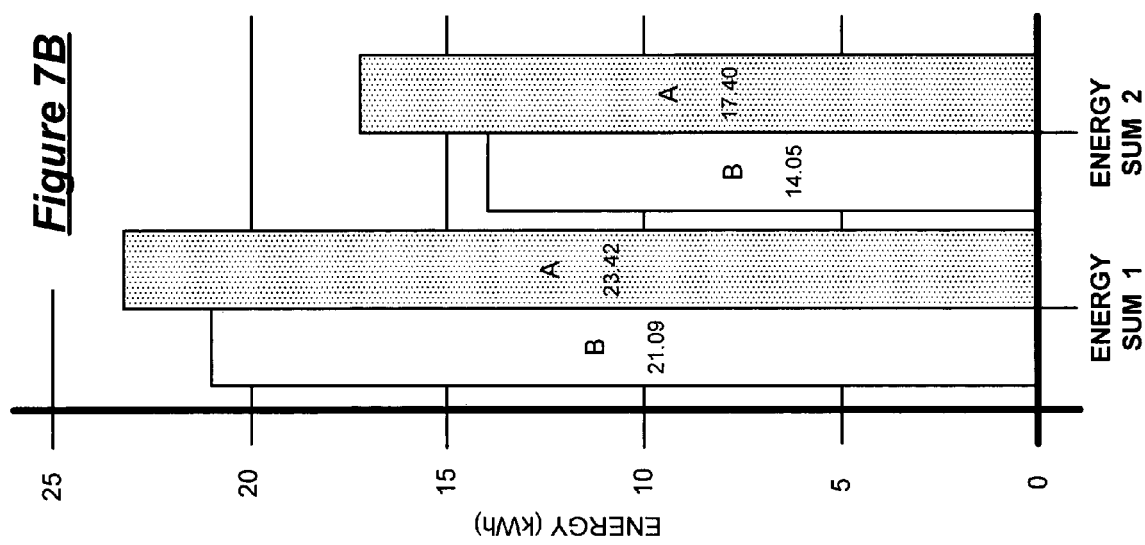
FIG. 7B charts an example of the calculated total compression energy required for filling all the storage tanks at the station and for filling both vehicle tanks directly, based on two successive fills for a vehicle with two tanks.

$z$ = Number of Compression Stages $k = C_p/C_v$ $C_p$ = Molar heat at $const$ pressure $C_v$ = Molar heat at $const$ volume The energy required for compression, either into the station banks, or directly into the vehicle tank, after two fills was calculated for each scenario assuming an ideal gas, four compression stages, no losses due to blow by, friction, etc. FIG. 7A and FIG. 7B are charts, respectively comparing calculations of "ideal" compression energy required to fill all station banks and all vehicle tanks directly to full after two vehicle fills. In the instances indicated in FIG. 7A and in energy sum 1 in FIG. 7B, the compressor compresses hydrogen into the station storage banks. Energy sum 2 in FIG. 7B represents the example of a slow, overnight fill where the station compresses the hydrogen directly into the vehicle tank. In all instances, the energy requirement necessary to refill multiple tanks of the system of the invention "B" is less than the energy requirement necessary to refill multiple tanks of the prior art "A"

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A hydrogen powered vehicle having multiple on board tanks for the storage of hydrogen gas under pressure including a system for refilling more than one on board tank from a station refilling line connected to the tanks wherein:
   (1) each tank on the vehicle is connectable to the refilling line through a manifold and pressurized hydrogen from the refilling line flows into one or more on board tank;
   (2) a pressure sensitive check valve associated with each tank is interposed between the tank and the refill line wherein the tanks fill in order from the lowest pressure to the highest pressure until the rated capacity of the tank being filled is reached and the check valve associated with the tank being filled closes and pressurized hydrogen from the refilling line flows into a next one or more on board tank until the pressure in the next one or more on board tank reaches a predetermined level; and
   (3) the sequence of paragraph (2) is repeated for all tanks until all tanks are filled to the same predetermined pressure.

2. A system for refilling one or more on board tanks for the storage of hydrogen gas under pressure in a vehicle having multiple on board tanks from a station refilling line wherein:

a. each tank on the vehicle is connectable to the refilling line through a manifold and a controllable openable and closeable valve is operatively interposed between each tank inlet and the refill line, and pressurized hydrogen from the refilling line flows into one or more on board tank until the pressure in the one or more on board tank reaches a predetermined level; and b. when the pressure in the one or more tank reaches a predetermined level, the valve on a first tank is closed after the valve on a next tank is opened, and hydrogen from the refilling line flows to the one or more next on board tank, filling the next one or more on board tank until the pressure in the next one or more on board tank reaches a predetermined level; and c. the sequence of paragraph (b) is repeated for all tanks on the vehicle until all tanks are filled to a predetermined pressure.

3. A system for refilling one or more on board tanks for the storage of hydrogen gas under pressure in a vehicle having multiple on board tanks from a station refilling line wherein:

a. each tank on the vehicle is connectable to the refilling line through a manifold and a controllable openable and closeable valve is operatively interposed between each tank inlet and the refill line, and pressurized hydrogen from the refilling line flows into one or more on board tank until the pressure in the one or more on board tank reaches a predetermined level; and b. when the pressure in the one or more tank reaches a predetermined level, the valve on a next tank opens essentially simultaneously with the closing of the valve on the preceding tank that has been filled, and hydrogen from the refilling line flows to the one or more next on board tank, filling the next one or more on board tank until the pressure in the next one or more on board tank reaches a predetermined level; and c. the sequence of paragraph (b) is repeated for all tanks on the vehicle until all tanks are filled to a predetermined pressure.

4. A refilling system for a hydrogen powered vehicle having multiple on board tanks for the storage of hydrogen gas under pressure wherein each tank is connectable to a refilling line comprising:

a. a connection of each tank on the vehicle for engagement with the refilling line through a manifold;

b. a controllable openable and closeable valve operatively interposed between the inlet of each tank and the refill line wherein;

c. an operative interconnection of each of the multiple tanks with sensors that measure pressure and temperature in the tank, the sensors being in turn interconnected with a control mechanism that opens and closes the valve associated with the tank upon a measure of a predetermined pressure and temperature sensed in the tank;

wherein:

d. pressurized hydrogen from the refilling line flows into one or more on board tank until the pressure in the one or more on board tank reaches a predetermined level and the control mechanism switches the refilling line flow to a next tank; and e. when the pressure in the one or more tank reaches a predetermined level, hydrogen from the refilling line flows to the one or more next on board tank, filling the next one or more on board tank until the pressure in the next one or more on board tank reaches a predetermined level; and f. the sequence of paragraph (e) is repeated for all tanks on the vehicle until all tanks are filled to one of a final predetermined pressure.

5. A system for evacuating stored hydrogen gas from multiple on board storage tanks in a hydrogen powered vehicle wherein the evacuation of each on board tank is controlled by an outlet valve and hydrogen is evacuated from the more than one on board tank to power the vehicle in a sequence wherein:

if "n" represents the number of on board tanks and "z" represents a consecutive number of a tank in a sequence of tanks on board, hydrogen gas is evacuated from tank "z" until a threshold pressure is reached wherein the closing of the outlet valve on tank "z" occurs simultaneously with the opening of an inlet valve on tank "z-1" and the next successive tank "z-1" in the on board hydrogen bank is evacuated until a threshold pressure is reached, and the same steps are repeated with each successive on board tank.

6. A system for evacuating stored hydrogen gas from multiple on board storage tanks in a hydrogen powered vehicle wherein the evacuation of each on board tank is controlled by a pressure sensitive operable at a predetermined pressure sensed and hydrogen is evacuated from the more than one on board tank to power the vehicle in a sequence wherein:

if "n" represents the number of on board tanks and "z" represents a consecutive number of a tank in a sequence of tanks on board, hydrogen gas is evacuated from tank "z" until a threshold pressure is reached wherein the closing of the outlet valve on tank "z" occurs simultaneously with the opening of an inlet valve on tank "z-1" and the next successive tank "z-1" in the on board hydrogen bank is evacuated until a threshold pressure is reached, and the same steps are repeated with each successive on board tank.

7. A system for evacuating stored hydrogen gas from multiple on board storage tanks in a hydrogen powered vehicle wherein the evacuation of each on board tank is controlled by an outlet valve controlled by an actuator and hydrogen is evacuated from the more than one on board tank to power the vehicle in a sequence wherein:

if "n" represents the number of on board tanks and "z" represents a consecutive number of a tank in a sequence of tanks on board, hydrogen gas is evacuated from tank "z" until a threshold pressure is reached wherein the closing of the outlet valve on tank "z" occurs simultaneously with the opening of an inlet valve on tank "z-1" and the next successive tank "z-1" in the on board hydrogen bank is evacuated until a threshold pressure is reached, and the same steps are repeated with each successive on board tank.

8. A hydrogen powered vehicle having multiple on board tanks for the storage of hydrogen gas under pressure wherein the evacuation of each on board tank is controlled by an outlet valve and hydrogen is evacuated from the more than one on board tank to power the vehicle in a sequence wherein:

if "n" represents the number of on board tanks and "z" represents a consecutive number of a tank in a sequence of tanks on board, hydrogen gas is evacuated from tank "Z" until a threshold pressure is reached wherein the opening of the outlet valve on tank "z-1" occurs before the closing of the outlet valve on tank "z" and the next successive tank "z-1" in the on board hydrogen bank is evacuated until a threshold pressure is reached, and the same steps are repeated with each successive on board tank.

9. A system for evacuating stored hydrogen gas from multiple on board storage tanks in a hydrogen powered vehicle wherein the evacuation of each on board tank is controlled by an outlet valve and hydrogen is evacuated from the more than one on board tank to power the vehicle in a sequence wherein:

if "n" represents the number of on board tanks and "z" represents a consecutive number of a tank in a sequence of tanks on board, hydrogen gas is evacuated from tank "z" until a threshold pressure is reached wherein the opening of the outlet valve on tank "z-1" occurs before the closing of the outlet valve on tank "z" and the next successive tank "z-1" in the on board hydrogen bank is evacuated until a threshold pressure is reached, and the same steps are repeated with each successive on board tank.

10. A system for evacuating stored hydrogen gas from multiple on board storage tanks in a hydrogen powered vehicle wherein the evacuation of each on board tank is controlled by a pressure sensitive valve operable at a predetermined pressure sensed and hydrogen is evacuated from the more than one on board tank to power the vehicle in a sequence wherein:

if "n" represents the number of on board tanks and "z" represents a consecutive number of a tank in a sequence of tanks on board, hydrogen gas is evacuated from tank "z" until a threshold pressure is reached wherein the opening of the outlet valve on tank "z-1" occurs before the closing of the outlet valve on tank "z" and the next successive tank "z-1" in the on board hydrogen bank is evacuated until a threshold pressure is reached, and the same steps are repeated with each successive on board tank.

11. A system for evacuating stored hydrogen gas from multiple on board storage tanks in a hydrogen powered vehicle wherein the evacuation of each on board tank is controlled by an actuator activated outlet valve and hydrogen is evacuated from the more than one on board tank to power the vehicle in a sequence wherein:

if "n" represents the number of on board tanks and "z" represents a consecutive number of a tank in a sequence of tanks on board, hydrogen gas is evacuated from tank "z" until a threshold pressure is reached wherein the opening of the outlet valve on tank "z-1" occurs before the closing of the outlet valve on tank "z" and the next successive tank "z-1" in the on board hydrogen bank is evacuated until a threshold pressure is reached, and the same steps are repeated with each successive on board tank.

12. A hydrogen powered vehicle having multiple on board tanks for the storage of hydrogen gas under pressure, a manifold having switchable inlet valves associated with the outlet of each tank and valves associated with the manifold are operatively interconnected separately with the outlet of each tank such that the flow of gas from a particular tank is determined by whether the manifold valve associated with the tank is open or closed, and in which hydrogen is evacuated from the more than one on board tank to power the vehicle in a sequence wherein:

if "n" represents the number of on board tanks and "z" represents a consecutive number of a tank in a sequence of tanks on board, hydrogen gas is evacuated from tank "z" until a threshold pressure is reached whereupon the closing of a manifold valve associated with tank "z" occurs simultaneously with the opening of a manifold valve associated with tank "z-1" until a threshold pressure is reached, and the same steps are repeated with each successive on board tank.

13. A hydrogen powered vehicle having multiple on board tanks for the storage of hydrogen gas under pressure, a manifold having switchable inlet valves associated with the outlet of each tank and valves associated with the manifold are operatively interconnected separately with the outlet of each tank such that the flow of gas from a particular tank is determined by whether the manifold valve associated with the tank is open or closed, and in which hydrogen is evacuated from the more than one on board tank to power the vehicle in a sequence wherein:

if "n" represents the number of on board tanks and "z" represents a consecutive number of a tank in a sequence of tanks on board, hydrogen gas is evacuated from tank "z" until a threshold pressure is reached whereupon the opening of a manifold valve associated with tank "z-1" occurs before the closing of a manifold valve associated with tank "z" until a threshold pressure is reached, and the same steps are repeated with each successive on board tank.

14. A hydrogen powered vehicle having multiple on board tanks for the storage of hydrogen gas under pressure wherein the evacuation of hydrogen from each on board tank is controlled by an outlet valve and the outlet valve on each of the multiple tanks is operably interconnected to sensors that measure pressure and temperature in the tank, wherein the sensors in turn are interconnected with a control mechanism that opens and closes the valve dependent upon the pressure and temperature sensed, and the one or more on board tanks are evacuated in a sequence wherein:

if "n" represents the number of on board tanks and "z" represents a consecutive number of a tank in a sequence of tanks on board, hydrogen gas is evacuated from tank "z" until a threshold pressure is reached whereupon tank "z" is shut down and the next successive tank "z-1" in the on board hydrogen bank is evacuated until a threshold pressure is reached, and the same steps are repeated with each successive on board tank.

15. A hydrogen powered vehicle having multiple on board tanks for the storage of hydrogen gas under pressure wherein the evacuation of hydrogen from each on board tank is controlled by a pressure sensitive outlet valve and the outlet valve on each of the multiple tanks is operably interconnected to sensors that measure pressure and temperature in the tank, wherein the sensors in turn are interconnected with a control mechanism that opens and closes the valve dependent upon the pressure and temperature sensed, and than one or more on board tanks are evacuated in a sequence wherein:

if "n" represents the number of on board tanks and "z" represents a consecutive number of a tank in a sequence of tanks on board, hydrogen gas is evacuated from tank "z" until a threshold pressure is reached whereupon tank "z" is shut down and the next successive tank "z-1" in the on board hydrogen bank is evacuated until a threshold pressure is reached, and the same steps are repeated with each successive on board tank.

16. A hydrogen powered vehicle having multiple on board tanks for the storage of hydrogen gas under pressure wherein the evacuation of hydrogen from each on board tank is determined by a pressure sensitive outlet valve controllable by an actuator and the outlet valve on each of the multiple tanks is operably interconnected to sensors that measure pressure and temperature in the tank, wherein the sensors in turn are interconnected with a control mechanism that opens and closes the valve dependent upon the pressure and temperature sensed, and than one or more on board tanks are evacuated in a sequence wherein:

if "n" represents the number of on board tanks and "z" represents a consecutive number of a tank in a sequence of tanks on board, hydrogen gas is evacuated from tank "z" until a threshold pressure is reached whereupon tank "z" is shut down and the next successive tank "z-1" in the on board hydrogen bank is evacuated until a threshold pressure is reached, and the same steps are repeated with each successive on board tank.

17. A hydrogen powered vehicle having multiple on board tanks for the storage of hydrogen gas under pressure including:

a manifold having switchable inlet valves associated with the outlet of each tank wherein the manifold inlet valves are operatively interconnected separately with the outlet of each tank such that the flow of gas from a particular tank is determined by whether the manifold inlet valve associated with the tank is open or closed;

an interconnection of each inlet valve on the manifold with a sensor that measures pressure in one or more of the manifold inlet or outlet and the tank, the sensor being in turn interconnected with a control mechanism that opens and closes the valve dependent upon the pressure sensed;

wherein hydrogen is evacuated from the more than one on board tank to power the vehicle, in the sequence:

if "n" represents the number of on board tanks and "z" represents a consecutive number of a tank in the sequence of tanks on board, hydrogen gas is evacuated from tank "z" until a threshold pressure is reached whereupon tank "z" is shut down and the next successive tank "z-1" in the on board hydrogen bank is evacuated until a threshold pressure is reached, and the same steps are repeated with each successive on board tank.

* * * * *